United States Patent
Ramdane et al.

(10) Patent No.: US 12,415,494 B2
(45) Date of Patent: Sep. 16, 2025

(54) METHOD FOR CONTROLLING THE TIGHTENING TORQUE OF AN IMPROVED ELECTROMECHANICAL BRAKE

(71) Applicant: HITACHI ASTEMO FRANCE, Drancy (FR)

(72) Inventors: Abdessamed Ramdane, Beauvais (FR); Dimitri Delmeire, Franconville (FR); Antony Auguste, Villiers-sur-Marne (FR)

(73) Assignee: HITACHI ASTEMO FRANCE (FR)

( * ) Notice: Subject to any disclaimer, the term of this patent is extended or adjusted under 35 U.S.C. 154(b) by 139 days.

(21) Appl. No.: 18/038,270

(22) PCT Filed: Nov. 22, 2021

(86) PCT No.: PCT/EP2021/082566
§ 371 (c)(1),
(2) Date: May 23, 2023

(87) PCT Pub. No.: WO2022/106709
PCT Pub. Date: May 27, 2022

(65) Prior Publication Data
US 2024/0092330 A1 Mar. 21, 2024

(30) Foreign Application Priority Data
Nov. 23, 2020 (FR) ...................... 2012030

(51) Int. Cl.
*B60T 13/74* (2006.01)
*B60T 8/17* (2006.01)
*B60T 8/172* (2006.01)
*B60T 8/1761* (2006.01)
*B60T 8/32* (2006.01)

(52) U.S. Cl.
CPC ............ *B60T 13/741* (2013.01); *B60T 8/172* (2013.01); *B60T 8/1761* (2013.01); *B60T 8/3255* (2013.01); *B60T 2220/04* (2013.01)

(58) Field of Classification Search
CPC ...... B60T 8/1755; B60T 8/172; B60T 8/1761; B60T 8/3255; B60T 13/741; B60T 2220/04; B60T 8/17636; B60T 7/042; B60T 2210/12; B60T 2270/82
See application file for complete search history.

(56) References Cited

U.S. PATENT DOCUMENTS

| 6,079,801 | A | 6/2000 | Zittlau |
| 10,759,399 | B2 | 9/2020 | Masuda |
| 10,800,386 | B2 * | 10/2020 | Mastrocola ........... F16D 65/183 |

(Continued)

*Primary Examiner* — Hai H Huynh
*Assistant Examiner* — Johnny H Hoang
(74) *Attorney, Agent, or Firm* — Dilworth IP, LLC

(57) ABSTRACT

A method for controlling the tightening torque of an electromechanical brake for a motor vehicle, the brake including an electric motor provided with a rotary shaft intended to drive mechanical brake-clamping mechanisms. The method includes steps of acquiring data from a wheel speed sensor that takes a characteristic measurement of the speed of at least one of the wheels of the vehicle, determining, according to the data from the wheel speed sensor, a deceleration indicator characteristic of the acceleration of the vehicle, regulating the tightening torque according to the deceleration indicator.

15 Claims, 1 Drawing Sheet

(56) References Cited

U.S. PATENT DOCUMENTS

| | | | |
|---|---|---|---|
| 2003/0125863 A1* | 7/2003 | Tamasho | F16D 55/226 |
| | | | 303/20 |
| 2017/0241398 A1* | 8/2017 | Shield | F16H 3/721 |
| 2020/0377070 A1* | 12/2020 | Yokoyama | B60T 13/741 |
| 2022/0169248 A1* | 6/2022 | Ito | B60W 30/16 |

* cited by examiner

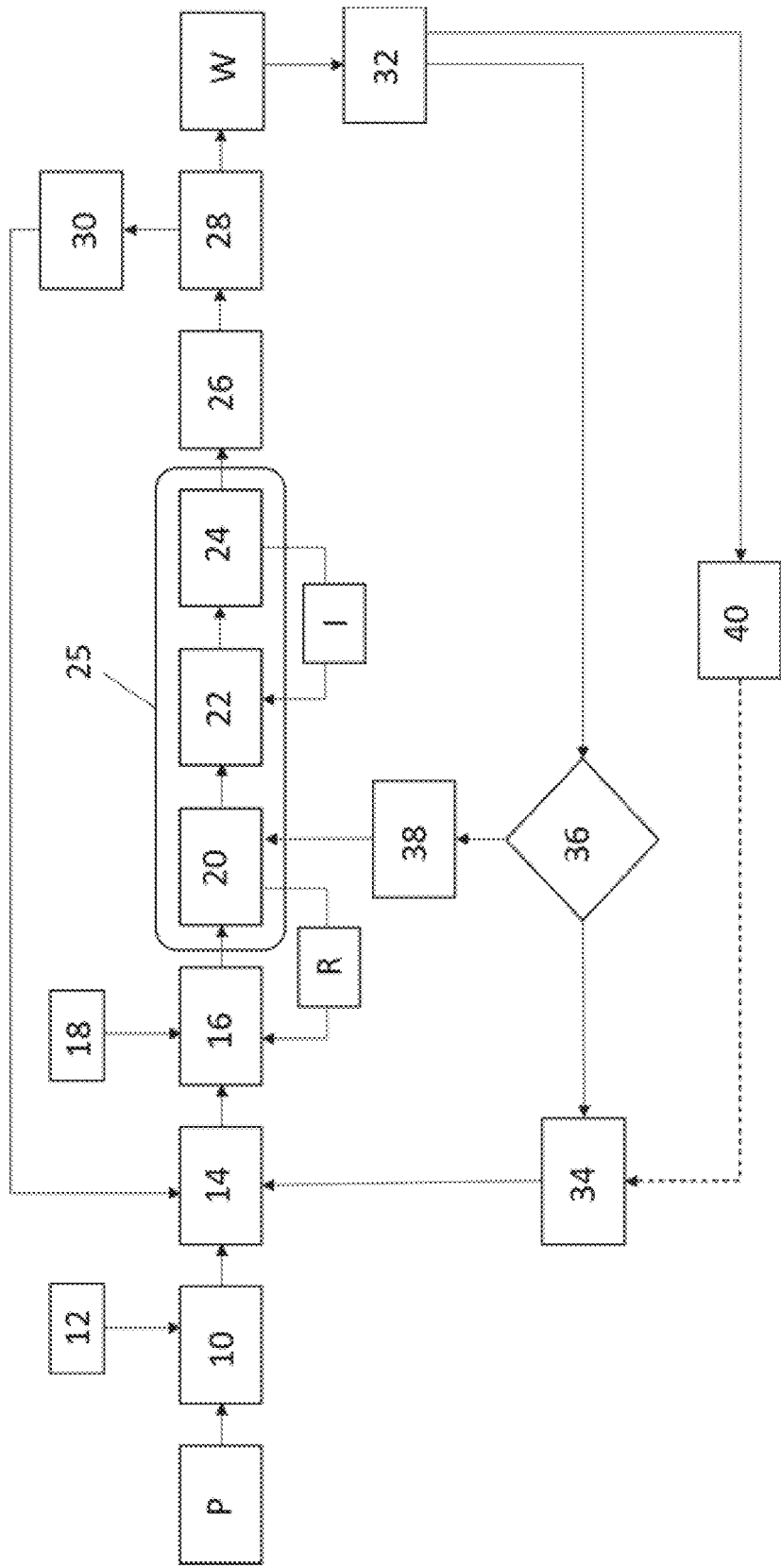

METHOD FOR CONTROLLING THE TIGHTENING TORQUE OF AN IMPROVED ELECTROMECHANICAL BRAKE

FIELD OF THE INVENTION

The invention relates to the field of motor vehicle braking actuators, more particularly the electromechanical brakes, and the methods for controlling their tightening torque.

BACKGROUND OF THE INVENTION

A motor vehicle braking system generally comprises mechanical brake-clamping means comprising in particular friction means, such as brake pads, connected to an actuator adapted to move these friction means towards the wheel of the vehicle to clamp it and thus brake the vehicle by friction, or move them apart to stop braking. In the case of an electromechanical brake, the mechanical clamping means are controlled by an electric motor provided with a rotary shaft driving them.

To control the tightening torque of electromechanical brakes for a vehicle, it is known in the state of the art to regulate the tightening torque according to indicators based on the data from sensors. The latter are generally installed on the electric motor or on the actuator moving the friction means. For example, it is known to use the data from a force sensor between the motor and the actuator to slave the brake tightening torque command and thus try to obtain the required vehicle deceleration.

However, in addition to the cost and complexity induced by installing and operating such a force sensor, it can only take into account factors affecting the tightening torque that depend on the electric motor and the actuator. In particular, it cannot take into account factors relating to the rest of the braking system, and even less the motor vehicle in general and its environment, such as for example the expansion of the brake pads caused by the heat generated during braking, the condition of the road along which the vehicle is driving, etc.

SUMMARY OF THE INVENTION

The invention therefore aims to provide a method for controlling a tightening torque of an electromechanical brake which takes into account more parameters than those relating to the electric motor of the brake and its actuator.

The invention therefore relates to a method for controlling the tightening torque of an electromechanical brake for a motor vehicle, the brake comprising an electric motor provided with a rotary shaft intended to drive mechanical brake-clamping means, characterised in that it comprises the following steps:
  acquiring data from a wheel speed sensor that takes a characteristic measurement of the speed of at least one of the wheels of the vehicle,
  determining, according to the data from the wheel speed sensor, a deceleration indicator characteristic of the acceleration of the vehicle,
  regulating the tightening torque according to the deceleration indicator.

Since a sensor that takes a characteristic measurement of the speed of a wheel of the vehicle is used, parameters relating to the motor vehicle in general and its environment can be taken into account to regulate the brake tightening torque. Such a method therefore provides braking control that is more precise than that obtained with the control methods of the prior art. In addition, since a speed sensor is less expensive and less difficult to use than a force sensor, the method according to the invention is less expensive to implement.

According to one embodiment of the invention, an actuator modifies friction means according to the tightening torque thus regulated.

According to a preferred embodiment of the invention, the wheel speed sensor is part of an anti-lock braking system or an electronic stability program system already fitted in the vehicle. This reduces the costs of implementing the method since a system already fitted in most vehicles, and in virtually all new vehicles, is reused. In addition, the data used is known to be reliable and precise in view of the safety standards that an anti-lock braking system must respect.

Preferably, the tightening torque is also regulated according to an indicator which characterises the position of the electric motor, or position indicator, calculated using the data from a sensor measuring a parameter related to the rotation of the motor shaft, or rotation sensor. Regulating the tightening torque of the motor according to its position further improves the precision of the control method.

According to a preferred embodiment of the invention, the tightening torque is also regulated according to the data from a sensor measuring a parameter related to the intensity of the electric current supplying the electric motor, or current sensor. Regulating the tightening torque of the motor according to its position further improves the precision of the control method.

According to a particular embodiment of the invention, the tightening torque is also regulated according to a braking setpoint, the braking setpoint preferably corresponding to the acquisition of a state of a brake pedal.

According to a particular embodiment of the invention, the data from the wheel speed sensor is recorded during a predetermined period and a physical model of the change in deceleration according to the change in the position indicator is built, this physical model depending on the data from the wheel speed sensor thus recorded.

Advantageously, if the data from the wheel speed sensor is temporarily unavailable, the tightening torque is regulated according to the data from the physical model. This preserves a certain degree of precision when controlling the tightening torque despite a temporary unavailability of the wheel speed sensor, that the physical model can replace until the sensor becomes available again.

According to another particular embodiment of the invention, the data from the wheel speed sensor is recorded during a predetermined period and filtered by a prediction filter, preferably a Kalman filter.

Advantageously, if the data from the wheel speed sensor is temporarily unavailable, the tightening torque is regulated according to the data from the prediction filter concerning an estimated state of the data from the wheel speed sensor. This preserves a certain degree of precision when controlling the tightening torque even in case of temporary unavailability of the wheel speed sensor, that the estimated state of the data from the wheel speed sensor filtered by the prediction filter can replace until the sensor becomes available again.

Preferably, the wheel speed sensor is used to detect whether at least one of the wheels of the vehicle is locked, and, if at least one of the wheels is locked, the anti-lock braking system or the electronic stability program system sends a command for controlling the tightening torque of the electromechanical brake. The anti-lock braking system or the electronic stability program system can therefore replace the braking control if the wheels are locked, which increases the vehicle safety.

The invention also relates to a braking system adapted to implement the method according to the invention.

The invention also relates to a vehicle comprising the braking system according to the invention.

BRIEF DESCRIPTION OF THE FIGURE

The invention will be better understood on reading the following description, given solely by way of example and with reference to the accompanying drawing in which:

FIG. 1 is a diagram of a flowchart showing the operation of the method for controlling the tightening torque of an electromechanical brake according to a particular embodiment of the invention.

DETAILED DESCRIPTION

FIG. 1 is a diagram of a flowchart showing the operation of the method for controlling the tightening torque of an electromechanical brake according to a particular embodiment of the invention.

Conventionally, the electromechanical brake comprises an electric motor provided with a rotary shaft intended to drive mechanical brake-clamping means (not shown). The electric motor is preferably a brushless electric motor. Since it is an electromechanical brake of known type, it will not be described in detail here.

The brake-clamping mechanical means are controlled by a tightening torque command. To control the brake tightening torque, a deceleration command, corresponding to a required deceleration for the motor vehicle, is generated. This deceleration command may for example come from a driver of the vehicle, by pressing a brake pedal P, and this command is transmitted to a deceleration request member 10. The deceleration command may also come from a computer controlling an autonomous vehicle, or a control station controlling the vehicle remotely, etc.

The required deceleration command is converted into a raw command for controlling the tightening torque using a deceleration conversion model 12, of known type, giving the tightening torque according to the deceleration command. In this case, raw command for controlling the tightening torque means a tightening command resulting directly from the conversion of the deceleration command from the deceleration request member, in other words which has not yet been slaved.

The raw command for controlling the tightening torque thus obtained is sent to a deceleration control member 14 which, during a step of controlling the deceleration command, will obtain information from various indicators and adjust the raw command for controlling the tightening torque. The raw command for controlling the tightening torque will then be converted into a tightening torque to be reached, according to these indicators, in particular based on slaving of the command for controlling the tightening torque as will be described below.

The command for controlling the tightening torque to be reached is sent to a member 16 for determining the target position of the motor, which converts the command for controlling the tightening torque into a raw command giving the target position of the motor using a tightening torque conversion model 18, of known type, giving the target position of the motor according to the command for controlling the tightening torque to be reached.

Then, the raw command giving the target position of the motor is sent to a member 20 for controlling the position of the motor. At the same time, the position of the motor is indicated by a position indicator calculated according to the data from a rotation sensor R that takes a measurement of a parameter related to the rotation of the motor shaft.

The motor position data thus recorded is returned to the member 16 for determining the target position of the motor, to compare the difference between the actual position of the motor and the target position of the motor. In other words, the command for controlling the position of the motor is slaved. Thus, the tightening torque is also regulated according to the indicator which characterises the position of the electric motor.

Next, the command for controlling the position of the motor is sent to a member 22 for determining the intensity of the motor supply current, in order to adapt the command for controlling the intensity of the motor supply current to the position of the motor.

Then, the command for controlling the target intensity of the supply current is sent to a member 24 for controlling the intensity of the motor supply current. At the same time, the intensity of the motor supply current is indicated by a current indicator calculated according to the data from a supply current intensity sensor I.

The motor position data thus recorded is returned to the member 22 for determining the intensity of the motor supply current, to compare the difference between the actual intensity of the supply current and the target intensity of the supply current. In other words, the command for controlling the intensity of the motor supply current is slaved. Thus, the tightening torque is also regulated according to the data from the sensor I that takes a measurement of a parameter related to the intensity of the electric current supplying the electric motor.

Preferably, the member 20 for controlling the position of the motor, the member 22 for determining the intensity of the motor supply current and the member 24 for controlling the intensity of the motor supply current are controlled by a suitable control law such as for example field-oriented control 25, six step control or sliding mode control (SMC).

The motor supply intensity and motor position commands thus slaved are sent to a member 26 for calculating the stroke of a braking actuator which moves the friction means of the wheel W according to these commands. This member 26 for calculating the stroke of an actuator then sends the result of the actuator stroke calculation to a member 28 for calculating the tightening torque to be reached.

The result of the calculation of the tightening torque to be reached is sent to a member 30 for calculating the motor deceleration, which calculates according to the result of the calculation of the tightening torque to be reached, a deceleration corresponding to the motor vehicle deceleration only taking into account the calculation of the tightening torque to be reached resulting from the action of the electromechanical brake motor. It is qualified as "motor deceleration" since it only takes into account parameters related to the electromechanical brake motor, without a priori taking into account other factors such as for example the effect of heat on the brake pads or the vehicle environment, such as for example the road surface condition.

The result of the motor deceleration calculation is sent to the deceleration control member 14, to compare the difference between the motor deceleration thus calculated and the required deceleration command. In other words, the deceleration command is slaved to the calculated motor deceleration.

Obviously, the friction means affect the wheel speed. In this respect, during a step of collecting wheel speed data, data from a wheel speed sensor 32 that takes a characteristic measurement of the speed of at least one of the wheels of the vehicle is obtained.

In the embodiment shown on FIG. 1, to take advantage of equipment already fitted on the vehicle, the wheel speed sensor 32 is part of an anti-lock braking system (known as the trademark ABS for "Antiblockiersystem" in German), or an Electronic Stability Program (ESP) system. The wheel speed data is collected for example at regular time intervals and sent periodically to the deceleration control member 14 as will be described later.

The wheel speed sensor 32 is used to detect, for example via a locking detection device 36, if at least one of the wheels of the vehicle is locked. If at least one of the wheels is locked, the anti-lock braking system 38 sends a command for controlling the tightening torque of the electromechanical brake. In the preferred embodiment of the invention, this function is performed by the ABS system already fitted on the motor vehicle. The anti-lock braking system 38 can therefore replace the braking control if the wheels are locked, which increases the vehicle safety.

If no wheel locking is detected, during a step of calculating the deceleration, a deceleration indicator characteristic of the acceleration of the vehicle according to the data from the wheel speed sensor 32 is obtained. This wheel deceleration indicator is calculated using a wheel deceleration calculator 34. This indicator is qualified as "wheel deceleration" since it takes into account parameters affecting the wheel speed, and therefore factors such as for example the effect of heat on the brake pads or the vehicle environment, such as for example the road surface condition.

The value of this deceleration indicator is then sent to the deceleration control member 14, to compare the difference between the motor deceleration thus calculated and the required deceleration command. In other words, the command of the deceleration to be reached is slaved to the calculated wheel deceleration.

In addition, in the preferred embodiment shown on FIG. 1, the data from the wheel speed sensor is recorded during a predetermined period and filtered by a prediction filter 40. The prediction filter 40 is preferably a Kalman filter.

Thus, if the data from the wheel speed sensor 32 is temporarily unavailable, the tightening torque is regulated according to the data from the prediction filter 40 concerning an estimated state of the data from the wheel speed sensor 32. This preserves a certain degree of precision when controlling the tightening torque even in case of temporary unavailability of the wheel speed sensor, that the estimated state of the data from the wheel speed sensor 32 filtered by the prediction filter can replace until the sensor becomes available again.

To do this, in the embodiment shown on FIG. 1, the data from the wheel speed sensor 32 filtered by the prediction filter 40 is sent directly to the deceleration control member 14, which detects no new data from the wheel speed sensor 32 is available after a predetermined period of time. In this case, the data concerning the estimated state of the data from the wheel speed sensor 32 filtered by the prediction filter 40 is sent to the wheel deceleration calculator 34. The wheel deceleration calculator 34 then sends the deceleration indicator it has calculated to the deceleration control member 14.

In an alternative embodiment, the data from the wheel speed sensor 32 is recorded during a predetermined period and a physical model of the change in deceleration according to the change in the position indicator is built, this physical model depending on the data from the wheel speed sensor 32 thus recorded. This model is in particular a nomogram.

Thus, if the data from the wheel speed sensor is temporarily unavailable, the tightening torque is regulated according to the data from the physical model. This preserves a certain degree of precision when controlling the tightening torque even in case of temporary unavailability of the wheel speed sensor 32, that the physical model can replace until the sensor becomes available again. In other words, in this second embodiment, the physical model performs a function similar to that of the prediction filter.

According to one embodiment not shown on FIG. 1, the tightening torque is also regulated according to a braking setpoint, the braking setpoint corresponding to the acquisition of a state of the brake pedal P.

The invention is not limited to the embodiments described and other embodiments will be clearly apparent to those skilled in the art. In particular, it is possible to use a force sensor between the motor and the actuator to slave the braking torque command.

LIST OF REFERENCES

10: deceleration request member
12: deceleration conversion model
14: deceleration control member
16: member for determining the target position of the motor
18: tightening torque conversion model
20: member for controlling the position of the motor
22: member for determining the intensity of the motor supply current
24: member for controlling the intensity of the motor supply current
25: field-oriented control
26: member for calculating the stroke of the braking actuator
28: member for calculating the tightening torque
30: member for calculating the motor deceleration
32: wheel speed sensor
34: wheel deceleration calculator
36: locking detection device
38: anti-lock braking system
P: brake pedal
I: motor supply current intensity sensor
R: motor rotation sensor
W: wheel of the motor vehicle

The invention claimed is:

1. A method for controlling a tightening torque of an electromechanical brake for a motor vehicle, the electromechanical brake comprising an electric motor provided with a rotary shaft to drive mechanical brake-clamping means, wherein the method comprises steps of:
acquiring data repeatedly from a wheel speed sensor that takes a characteristic measurement of a speed of at least one wheel of the vehicle,
continuously determining, according to the data from the wheel speed sensor, a deceleration indicator of the vehicle,
regulating the tightening torque according to the deceleration indicator.

2. The method according to claim 1, wherein an actuator modifies friction means according to the tightening torque thus regulated.

3. The method according to claim 1, wherein the wheel speed sensor is part of an anti-lock braking system or an electronic stability program system already fitted in the vehicle.

4. The method according to claim 3, wherein the wheel speed sensor is used to detect whether the at least wheel of the vehicle is locked, and, if the at least one wheel is locked, the anti-lock braking system or the electronic stability program system sends a command for controlling the tightening torque of the electromechanical brake.

5. The method according to claim 1, wherein the tightening torque is also regulated according to a position indicator which characterizes a position of the electric motor calculated using the data from a rotation sensor measuring a parameter related to a rotation of the motor shaft.

6. The method according to claim 1, wherein the tightening torque is also regulated according to the data from a current sensor measuring a parameter related to an intensity of an electric current supplying the electric motor.

7. The method according to claim 1, wherein the tightening torque is also regulated according to a braking setpoint.

8. The method according to claim 7, wherein the braking setpoint corresponds to an acquisition of a state of a brake pedal.

9. The method according to claim 1 wherein the data from the wheel speed sensor is recorded during a predetermined period and filtered by a prediction filter.

10. The method according to claim 9, wherein, if the data from the wheel speed sensor is temporarily unavailable, the tightening torque is regulated according to the data from the prediction filter concerning an estimated state of the data from the wheel speed sensor.

11. The method according to claim 9, wherein the prediction filter is a Kalman filter.

12. A braking system adapted to implement the method according to claim 1.

13. A vehicle comprising the braking system according to claim 12.

14. A method for controlling a tightening torque of an electromechanical brake for a motor vehicle, the electromechanical brake comprising an electric motor provided with a rotary shaft to drive mechanical brake-clamping means, wherein the method comprises steps of:
 acquiring data from a wheel speed sensor that takes a characteristic measurement of a speed of at least one wheel of the vehicle,
 determining, according to the data from the wheel speed sensor, a deceleration indicator of the vehicle,
 regulating the tightening torque according to the deceleration indicator,
  wherein the tightening torque is also regulated according to a position indicator which characterizes a position of the electric motor calculated using the data from a rotation sensor measuring a parameter related to a rotation of the motor shaft, and
  wherein the data from the wheel speed sensor is recorded during a predetermined period and a physical model of a change in deceleration according to the change in the position indicator is built, this physical model depending on the data from the wheel speed sensor thus recorded.

15. The method according to claim 14, wherein, if the data from the wheel speed sensor is temporarily unavailable, the tightening torque is regulated according to the data from the physical model.

* * * * *